No. 892,910. PATENTED JULY 7, 1908.
C. W. STARK.
GRASS GRUBBER.
APPLICATION FILED AUG. 1, 1907.

4 SHEETS—SHEET 1.

WITNESSES:

INVENTOR
C. W. Stark
BY

Attorneys

No. 892,910.  
PATENTED JULY 7, 1908.  
C. W. STARK.  
GRASS GRUBBER.  
APPLICATION FILED AUG. 1, 1907.  
4 SHEETS—SHEET 2.

WITNESSES:  
INVENTOR  
C. W. Stark  
BY  
Attorneys

No. 892,910. PATENTED JULY 7, 1908.
C. W. STARK.
GRASS GRUBBER.
APPLICATION FILED AUG. 1, 1907.
4 SHEETS—SHEET 3.
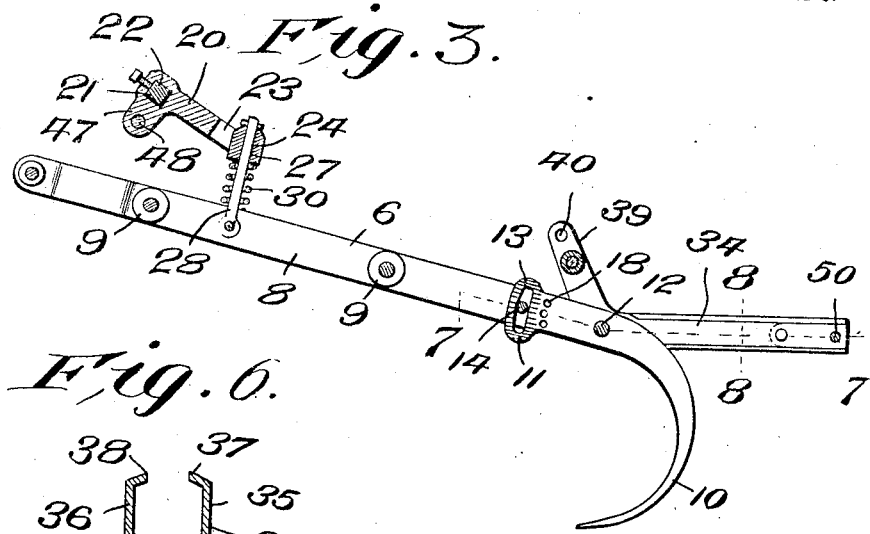
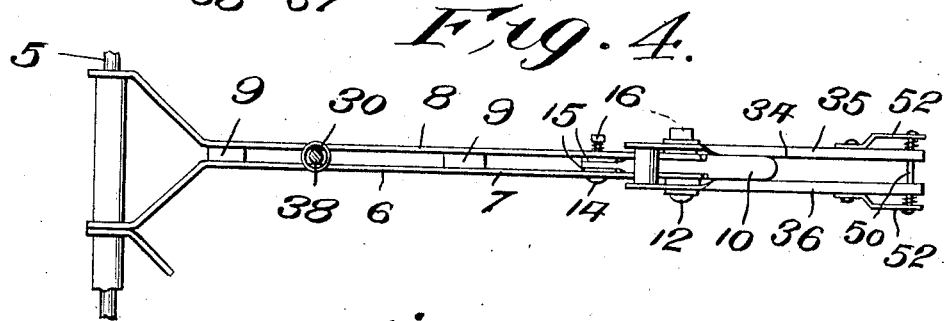
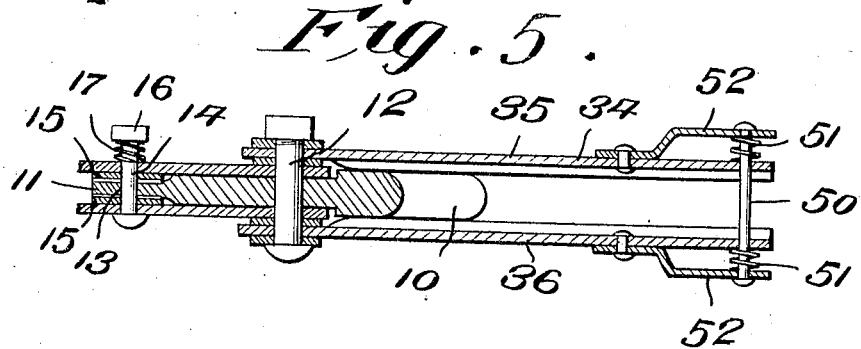
WITNESSES:
INVENTOR
C. W. Stark
BY
Attorneys No. 892,910. PATENTED JULY 7, 1908.
C. W. STARK.
GRASS GRUBBER.
APPLICATION FILED AUG. 1, 1907.
4 SHEETS—SHEET 4.
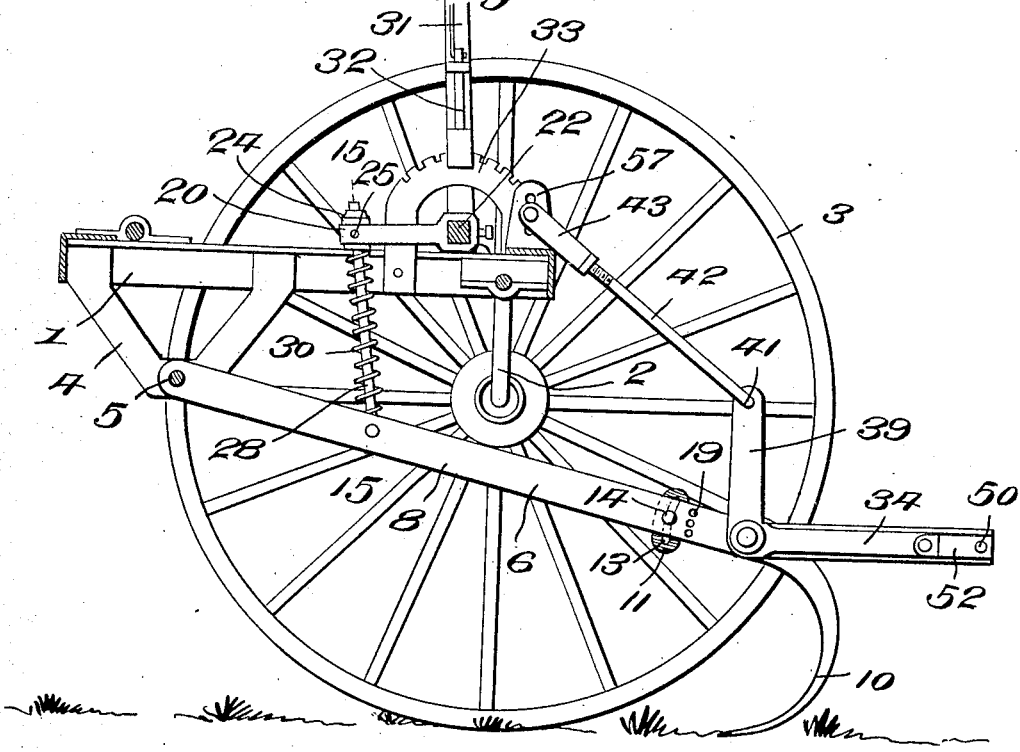
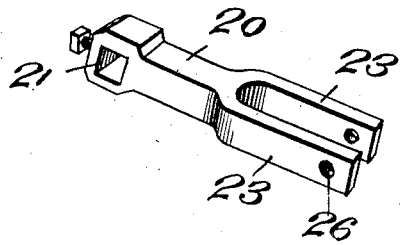
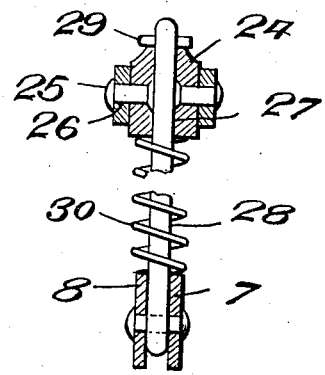
WITNESSES:
INVENTOR
C. W. Stark
BY
Attorneys

UNITED STATES PATENT OFFICE.

CHARLIS W. STARK, OF MOUNTAIN LAKE, MINNESOTA.

GRASS-GRUBBER.

No. 892,910.　　　Specification of Letters Patent.　　　Patented July 7, 1908.

Application filed August 1, 1907. Serial No. 386,562.

*To all whom it may concern:*

Be it known that I, CHARLIS W. STARK, a citizen of the United States, residing at Mountain Lake, in the county of Cottonwood and State of Minnesota, have invented certain new and useful Improvements in Grass-Grubbers; and I do hereby declare the following to be a full, clear, and exact description of the invention, such as will enable others skilled in the art to which it appertains to make and use the same.

My invention relates to new and useful improvements in grass grubbers and is more particularly an improvement over my former invention, for which I obtained Letters Patent #836,284, November 20, 1906, and my object is to provide means for removing grass, brush, or the like, bodily from the earth's surface, such as quack grass, sage brush and the like.

A further object is to provide means for cleaning the teeth of the machine should the grass cling thereto.

A still further object is to provide means for adjusting the several parts of the digger and a still further object is to provide means for raising and lowering the frame of the digger, whereby the teeth will be set deeper or shallower into the earth's surface.

Other objects and advantages will be hereinafter referred to and more particularly pointed out in the claims.

Figure 1:
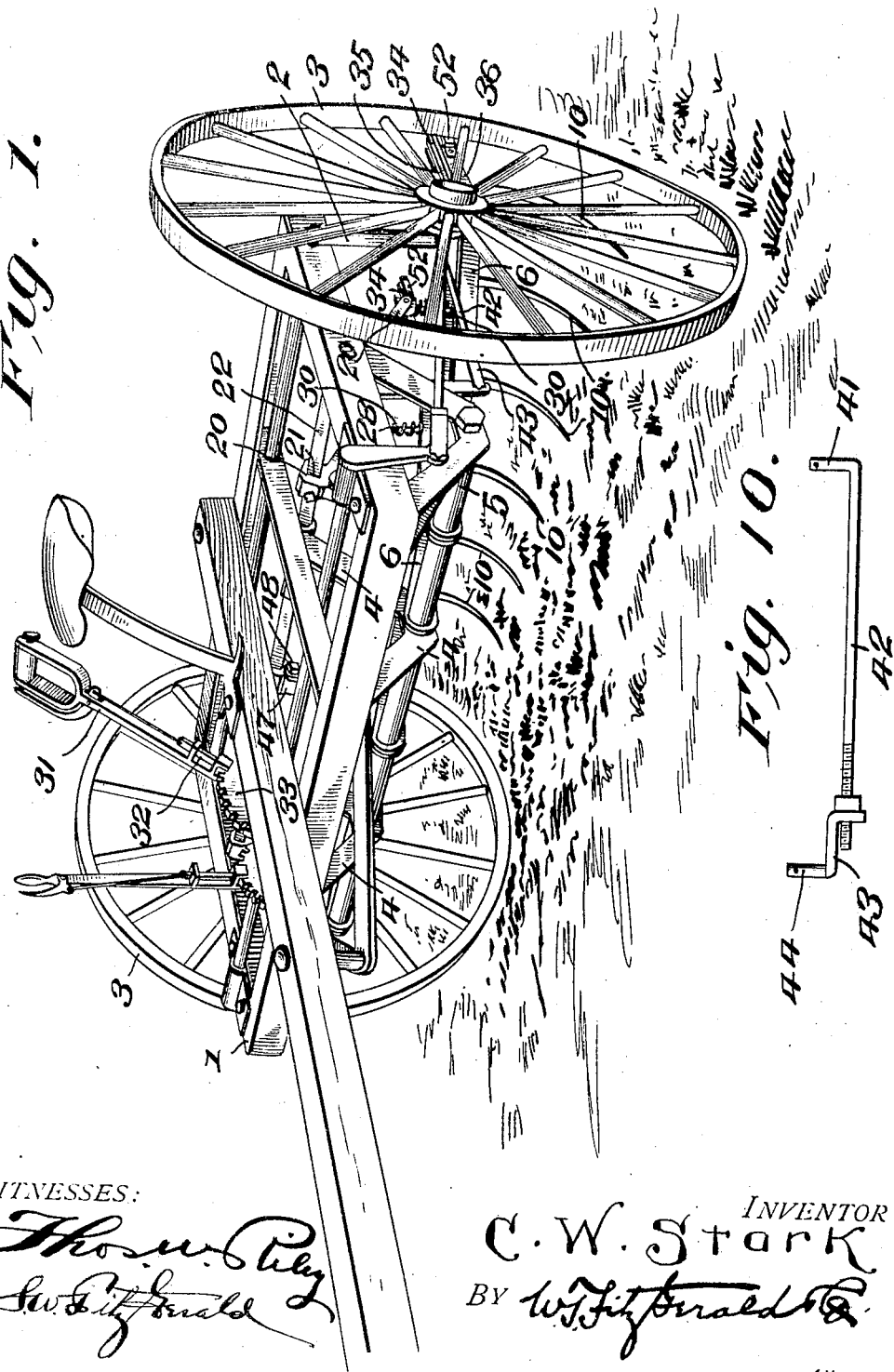
Figure 2:
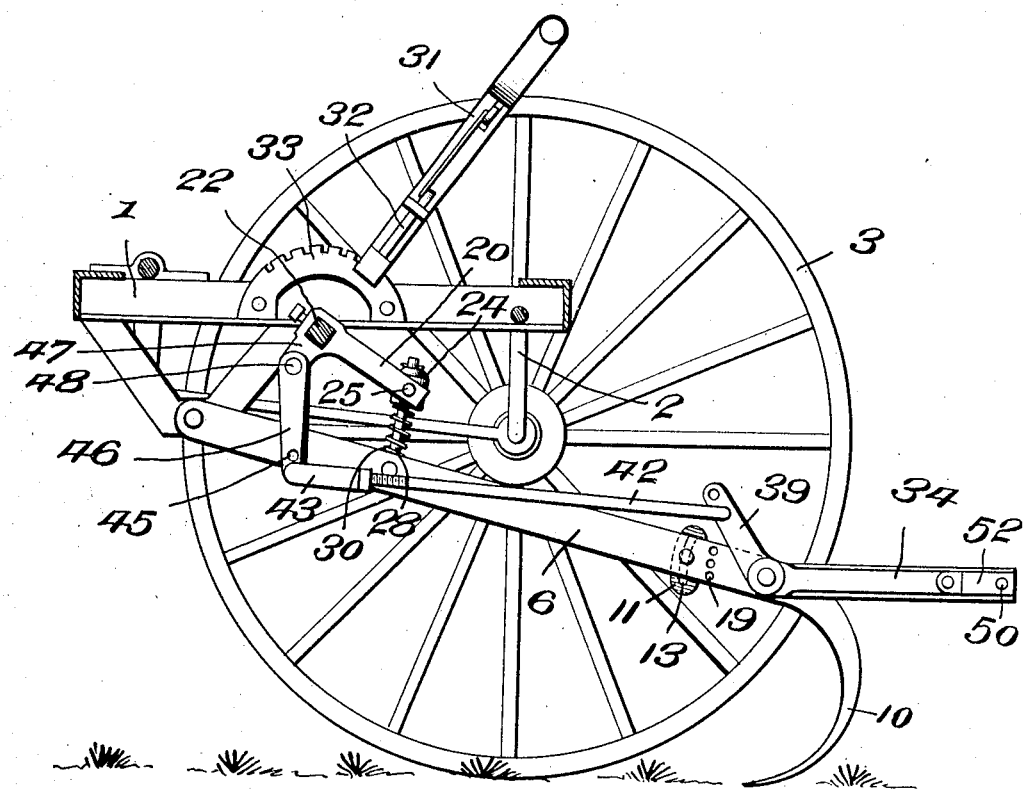

In the accompanying drawings which are made a part of this application, Figure 1 is a perspective view of my improved digger complete. Fig. 2 is a transverse, vertical sectional view through the digger. Fig. 3 is a detail elevation partly in section of one of the digger teeth and beams supporting the same. Fig. 4 is a top plan view thereof. Fig. 5 is a sectional view on an enlarged scale, as seen on line 7—7, Fig. 3. Fig. 6 is a sectional view on an enlarged scale, as seen on line 8—8, Fig. 3. Fig. 7 is a transverse, vertical, sectional view through the digger, showing another form of crank for raising and lowering the teeth. Fig. 8 is a detail, perspective view of that form of crank shown in Fig. 7. Fig. 9 is a detail, sectional view as seen on line 15—15, Fig. 7, and, Fig. 10 is a plan view of a pitman employed for operating the teeth-cleaning devices.

Referring to the drawings in which similar reference numerals designate corresponding parts throughout the several views, 1 indicates a frame, which may be constructed in any desired shape, and preferably of angle iron, the rear edge of said frame having pivotally mounted thereon an axle 2, to the free ends of which are secured the usual form of supporting wheels 3, the axle 2 having a cranked portion, so that by swinging the depending portions of the axle, the height of the frame above the earth's surface may be readily regulated, and thereby increasing or decreasing the depth to which the teeth are entered into the earth's surface. Depending from the forward end of the frame 1 are a plurality of hangers 4, in the lower ends of which are suspended a shaft 5, said shaft being adapted to receive the forward ends of a plurality of beams 6, said beams, as best shown in Fig. 4 of the drawings, being preferably constructed of paralleling bars 7 and 8, which are spaced apart by means of blocks 9. Pivotally mounted between the free ends of the bars 7 and 8 are my improved form of digging teeth, or fingers 10, the lower ends of which are pointed and curved, so as to readily enter the ground, while that portion of the tooth entering between the bars 7 and 8 is flattened and provided with a head 11 beyond its pivot pin 12, said head being provided with an oblong slot 13, through which extends a bolt 14, said bolt being carried by the beam 6. The face of the head 11 is preferably corrugated and is adapted to coöperate with corrugated plates 15, carried by the bolt 14, and one at each side of the head, the bolt 14 being of sufficient length to extend through and beyond the beam 6 and is provided with a nut 16, at its outer end, between which and the face of the beam 6, is located a spring 17, said spring being coiled around the bolt and is of sufficient tension to force the two bars forming the beam, inwardly, thereby clamping the plates 15 into engagement with the head 11, so that when the head is in its adjusted position, it will require a considerable strain on the lower end of the tooth to swing the tooth upon its pivot pin. By this construction it will be seen that should one of the teeth encounter a solid substance, the strain thereon will overcome the tension of the spring and allow the tooth to swing upon its pivot point and thereby passing over the obstruction and additional rigidity may be added to the teeth by providing the same with a plurality of bores 18 in that portion of the tooth between the head 11 and pivot pin 12, the bars 7 and 8 also being provided with a plurality of registering bores 19, through which and the bores 18, is adapted to be inserted a pin (not shown) constructed of wood, or like destructible material, in which instance, it will be seen that it will require a greater pull on the lower end of the tooth to swing the same on its pivot pin, but at the same time the pin through the bores will break before the strength of the tooth is affected.

The beam 6 and teeth carried thereby are raised and lowered through the medium of cranks 20, one end of which is provided with a substantially square opening 21, through which extends a square shaft 22, said shaft being rotatably mounted in any preferred manner to the parts of the frame 1. The opposite end of the crank 20 is bifurcated to form arms 23, which arms are adapted to extend to each side of a circular socket 24, said socket being provided on opposite sides with stub shafts 25, which enter seats 26 in the free ends of the arms 23, thereby permitting a rocking motion of the socket between the arms.

Extending centrally through the socket 24 is a bore 27, through which passes a hanger bar 28, the lower end of said bar being pivotally mounted between the bars 7 and 8 of the beam 6, while that portion of the hanger bar above the socket 24 is provided with a stop pin 29, thereby limiting the downward movement of the hanger bar. The hanger bar is slidably mounted in the socket 24, so that the beam 6 may be moved upwardly when the teeth encounter an obstruction, without interfering with the position of the cranks 20, so that any one of the plurality of teeth may be raised without affecting the remainder of the teeth.

To cause the beam to immediately descend after the tooth has been freed of the obstruction, a spring 30 is placed around the hanger bar 28, between the beam 6 and socket 24, said spring exerting downward pressure on the beam at all times and it will be seen that as soon as the tooth is released from the object, the spring will force the beam and tooth carried thereby downward until stopped by the stop pin 29.

Fixed at any suitable point to the square shaft 22, is a lever 31, such as is shown and described in my former patent, said lever having a latch 32, which is adapted to coöperate with a rack bar 33, carried by the frame 1, and as the lever 31 is fixed to the shaft 22, it will be seen that when said lever is moved forwardly or rearwardly, the cranks 20 will be correspondingly rocked and the beams 6 raised or lowered, and by providing the rack bar 22, with a plurality of notches, with which the lever 31 engages, the beams may be adjusted upwardly or downwardly, as desired.

It has been found that the grass will, in some instances, cling to the teeth 10, when the teeth are elevated, and in order to positively clean the teeth and cause the grass to drop to the ground, I provide cleaners 34 for said teeth, said cleaners consisting of a pair of metallic strips 35 and 36, one of which is located at each side of the teeth 10 and said strips are pivotally mounted upon the pin 12, employed for pivotally securing the tooth to the beam, the length of said strips being sufficient to extend beyond the lower end of the tooth when the tooth is elevated to its fullest extent and in order to positively clean the teeth, the upper and lower edges of said strips are provided with inwardly directed flanges 37 and 38, respectively, which bear against the outer surface of the tooth as the tooth passes between the strips.

As the strips are elevated with the beams 6, it is necessary to lower said strips in order to thoroughly clean the teeth and to this end, the inner ends of the strips are provided with extensions 39, which extend above the beams 6, said extensions having alining openings 40 therein, through which takes the cranked end 41 of a pitman 42, the opposite end of said pitman being threaded to enter a threaded opening in a strap 43, said strap having at its free end a cranked portion 44, similar to the cranked end 41, which portion is adapted to enter an opening 45 in the depending end of a crank lever 46, the upper end of said crank lever being adjustably secured to a projection 47 on the crank 20, a locking bolt 48 being introduced through the lever 46 and projection 47 and in order to prevent swinging movement of the lever 46 on the locking bolt 48 the meeting faces of the lever 46 and projection 47 are provided with corrugations 49, so that when the lever 46 is positively clamped against the face of the projection 47, the lever 46 will be held rigid with the crank 20 and caused to rock therewith and as the lever 31 is thrown forward to raise the beams 6, the rocking of the shaft 22 will swing the crank lever 46 rearwardly and cause the free end of the cleaners 34 to descend, thereby removing the grass or other objects adhering to the teeth.

As the extreme lower end of the teeth 10 are reduced in size, it becomes necessary to provide means for decreasing the space between the free ends of the strips 35 and 36 and to readily accomplish this result, a bolt 50 is introduced through the free ends of the strips 35 and 36 and extended beyond each edge thereof, that portion of the bolt extending beyond each face of the strips being surrounded by springs 51 and as the outer ends of the bolts 50 are each provided with a head, the tension of the springs 51 are directed inwardly, thereby forcing the free ends of the strips 35 and 36 towards each other and it will be seen that as the strips descend to clean the teeth, the springs 51 will hold the ends of the strips against the teeth, throughout their entire length.

The grass, or the like, is prevented from catching upon the extended ends of the bolts 50 by placing shields 52 over the ends of the bolts and fastening the free ends thereof to the faces of the strips 35 and 36, thus forcing the grass away from the ends of the bolt and preventing the grass from catching thereon.

In Fig. 7 of the drawings I have shown the arrangement of the several parts for raising the beams by giving a rearward pull to the lever 31, instead of a forward thrust, and, in this instance, the shaft 22 is located adjacent the rear of the frame 1 and the rack bar and lever coöperating therewith, accordingly located. The crank 20, in this instance, is extended forwardly from the shaft 22, instead of rearwardly and as the shaft 22 is preferably located above the frame 1 and the crank 20 extended horizontally, therefrom, the hanger bar 28 is accordingly increased in length. When the parts of the device are thus arranged, the crank sections 44 are secured to ears 57 mounted upon the rear edge of the frame 1, so that when the beams 6 are elevated, the strips 35 and 36 will be operated in the same manner as when the strips are operatively secured to the crank lever 46.

It will thus be seen that I have provided a very efficient device for removing grass, or the like, from the ground and tearing the same out by the roots, thereby positively destroying the plants.

It will further be seen that the device may be as readily employed for cultivating the soil, as well as destroying the plants growing thereon and, likewise, it will be seen that the grass or earth adhering to the teeth will be positively removed when the teeth are elevated.

What I claim is:

1. In a digger of the class described, the combination with a frame, a supporting axle therefor, and wheels upon said axle; of a plurality of beams secured at their forward end to the frame, teeth pivotally mounted on said beams, means to normally hold said teeth fixed to said beams, a shaft carried by said frame, a lever adapted to rotate said shaft, means between said shaft and beams adapted to raise or lower said beams simultaneously when the shaft is rotated, strips pivotally mounted at each side of said teeth, said strips forming cleaners, means to force the inner ends of said strips towards each other and additional means to lower said strips, when the beams are elevated.

2. In a digger of the class described, the combination with a frame, supporting means therefor, a plurality of beams hingedly secured to said frame, means to raise and lower said beams and a tooth pivotally mounted to each of said beams; of a cleaner for said teeth, comprising a pair of strips pivotally mounted at opposite sides of said teeth, inwardly directed flanges on said strips, extensions at the inner ends of said strips, means to lower said strips when the beams are elevated, a bolt extending through the free ends of said strips and means on said bolt to normally direct the free ends of said strips inwardly.

3. In a digger of the class described, the combination with a frame, a plurality of beams pivotally secured to said frame, teeth on said beams, a shaft, cranks on said shaft, means connecting said cranks to said beams and means to rotate said shaft; of cleaning devices for said teeth, comprising paralleling strips, inwardly directed flanges on said strips, extensions at the inner ends of said strips, means to pivotally mount said strips on opposite sides of said teeth, pitmen secured to said extensions and means to anchor the opposite ends of said pitmen, whereby when the teeth are raised, the strips will be swung upon their pivot points and the teeth cleaned.

4. A digger of the class described, comprising the combination with a frame, beams pivotally secured to said frame, teeth carried by said beams and cranks adapted to raise and lower said beams; of cleaning devices pivotally secured to said teeth, said cleaning devices comprising parallel strips, a bolt extending through the free ends of said strips, springs on the outer ends of said bolts, adapted to direct the ends of said strips inwardly, extensions at the inner ends of said strips, a pitman adjustably secured to said extensions, and a crank lever carried by said crank and adapted to receive the opposite end of said pitman, whereby when the beams are elevated, the cleaners will be swung upon their pivot points and the obstructions removed from said teeth.

In testimony whereof I have signed my name to this specification in the presence of two subscribing witnesses.

CHARLIS W. STARK.

Witnesses:
  ABR. JANZEN,
  C. C. WIEBE.